(12) United States Patent
Smithson et al.

(10) Patent No.: US 7,353,421 B1
(45) Date of Patent: Apr. 1, 2008

(54) METHOD AND APPARATUS FOR DETERMINING AND ALLOCATING CLOCK FREQUENCIES FOR PLURALITY OF PROCESSING UNITS ON SYSTEM START-UP OR RESETTING OF THE SYSTEM

(75) Inventors: Stuart Anthony Smithson, Lanchester (GB); Martin Bate, Reading (GB)

(73) Assignee: Sun Microsystems, Inc., Santa Clara, CA (US)

( * ) Notice: Subject to any disclaimer, the term of this patent is extended or adjusted under 35 U.S.C. 154(b) by 407 days.

(21) Appl. No.: 10/820,253

(22) Filed: Apr. 8, 2004

(51) Int. Cl.
  *G06F 1/04* (2006.01)
  *G06F 1/00* (2006.01)
  *G06F 1/32* (2006.01)
(52) U.S. Cl. .................... 713/600; 713/501; 713/320
(58) Field of Classification Search ............... 713/600, 713/501, 320, 322; 331/78; 327/8
  See application file for complete search history.

(56) References Cited

U.S. PATENT DOCUMENTS

| 5,506,545 | A | * | 4/1996 | Andrea .................... 331/78 |
| 5,774,703 | A | * | 6/1998 | Weiss et al. ............... 713/501 |
| 6,075,211 | A | * | 6/2000 | Tohya et al. ............... 174/255 |
| 6,804,790 | B2 | * | 10/2004 | Rhee et al. ................ 713/320 |
| 7,058,828 | B2 | * | 6/2006 | Barr et al. ................. 713/320 |

* cited by examiner

*Primary Examiner*—Suresh K Suryawanshi
(74) *Attorney, Agent, or Firm*—Meyertons Hood Kivlin Kowert & Goetzel, P.C.; B. Noël Kivlin

(57) ABSTRACT

A method and apparatus for operating a computer system comprising a first and a second computing unit, the method comprising selecting a first clock frequency for operation of said first computing unit, and selecting a second clock frequency for operation of said second computing unit wherein said first and said second frequencies differ one from the other by at least a predetermined bandwidth.

17 Claims, 4 Drawing Sheets

US 7,353,421 B1

METHOD AND APPARATUS FOR DETERMINING AND ALLOCATING CLOCK FREQUENCIES FOR PLURALITY OF PROCESSING UNITS ON SYSTEM START-UP OR RESETTING OF THE SYSTEM

FIELD OF THE INVENTION

The present invention relates to a method of setting clock speeds for a computer system comprising a plurality of computing units. It is particularly applicable to a computer system comprising a plurality of computer processing units (CPUs), for example a plurality of computer servers in a single rack or a plurality of CPUs in the same server.

BACKGROUND OF THE INVENTION

Any computer system operating at a given clock frequency generates electromagnetic radiation of a frequency related to the clock frequency. Legislative and industry practice standards define maximum levels for these emissions so as to keep them within safe levels. Examples of formal tests of electromagnetic radiation in these situations are NEBs, FCC and European CE mark, and traditionally the intensity of radiation is measured by instruments with bandwidths of about 120 KHz.

When several CPUs are located in close proximity to each other, for example when multiple cores are involved, then their emissions tend to be cumulative and the additive effect of the emissions, particularly in a large concentration of CPUs, may inadvertently exceed legal standards at certain frequencies, even though emissions from each individual core meet the standard. Typically the higher emissions will be at harmonic frequencies or sub-harmonics of the CPU's clock and memory bus frequency (dependent on the number of CPUs).

Previously this problem has been addressed by a spread spectrum technique in which the memory bus clock on a single server is continually varied across a predefined range. Such technology is built into a chip so that it is effectively integral with the CPU and it is thus relatively complex and cannot be retrofitted or easily altered or adapted.

SUMMARY OF THE INVENTION

The present invention provides a different clock frequency for each of a plurality of computing units of a computer system. Each different clock frequency is chosen to differ from at least one other of said frequencies by at least a predetermined bandwidth.

Preferably this minimum predetermined bandwidth is that which would allow the separation of frequencies to reduce the level of emissions within the measurement bandwidth to be below any given international legal electromagnetic emission limit. This separation could be from at least 1 Hz to at least 40 Ghz. Most conveniently it would be the bandwidth of a standard emission measuring device, which is typically 120 KHz, and may for example advantageously be several times higher such as 1 MHZ, or 2 MHZ.

In one embodiment the clock frequency at which each unit operates is determined as a function of a number generated, accessed or allocated on start-up or resetting of the system. For example such a number may be used as a multiplier of a base frequency which may be a difference between the clock frequency of two computing units.

The number may be generated by one or more random number generators, or could be allocated by using a digit from the identifying address of the respective computing unit such as the CPU or server. Alternatively each different frequency could be dynamically allocated on start-up or resetting, using a start-up sequence which comprises identifying the core servers in a system, for example in a box or in a rack, but this method tends to be slower.

The invention provides a relatively simple method which is generally straightforward to implement.

The present invention also provides apparatus for start-up of a computer system comprising a plurality of computing units. The apparatus comprises means for setting a different clock frequency for each unit so that the units operate at a plurality of different frequencies. Each frequency differs from another of said frequencies by at least a predetermined minimum bandwidth. This frequency bandwidth may be a multiple of a predetermined base frequency. The multiple is determined by a respective number allocated on start-up or resetting of the system and the number may be generated by a random number generator or dynamically allocated.

BRIEF DESCRIPTION OF DRAWINGS

For a better understanding of the present invention and to show how the same may be carried into effect, reference will now be made to examples of the invention, described with reference to the accompanying drawings in which.

DETAILED DESCRIPTION OF DRAWINGS

The invention typically applies to a computer system such as the Sun Microsystems, Inc. Netra (TM) TI AC/DC 200 servers system in which six servers are mounted together in a single rack. Traditionally these servers would each be operated at the same CPU clock frequency of a value X between 600-700 MHz and preferably the higher speeds are used to optimize performance. The memory bus operates at one-sixth of the CPU speed, for example for a CPU speed of 648 MHz the memory bus speed would be 108 MHz. Emissions from such a system tend to reach peaks at multiple harmonics of the memory bus frequency, typically up to nine times the base frequency, i.e. up to 972 MHz in this example. A typical legal limit for such emissions would be 57 dBμV at 3 m but the additive effect of the harmonics tends to exceed this at certain frequencies.

Figure 1:
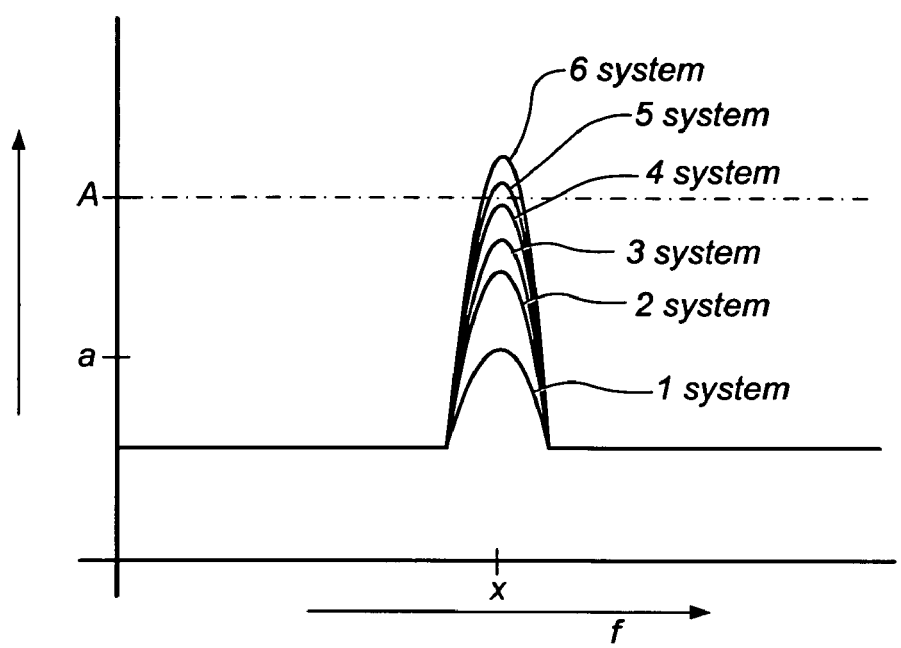
FIG. 1 is a schematic graph showing emission levels for a known computing system.

Such an effect can be seen in the graph of FIG. 1 which shows the cumulative effect on the level of radiation for a known multicore computer system, comprising up to six CPU systems 1 to 6 all running at frequency X. The legal limit which is typically 57 dBμV at 3 m, is indicated at A and it can be seen that the emission level exceeds this limit in this example when five or six of the CPU systems are operating. The cumulative effect is on a logarithmic scale (20log (N total/N original)) and, for example, if each system emits at a level of 20 dBμV then the cumulative level of operating system 1 and system 2 would be 26 dBμV, for systems 1 to 3 29.5 dBµV, for systems 1 to 4 32 dBµV, for five 14 dBµV and for systems 1 to 6 would be 35.5 dBµV. This is evidently undesirable.

Figure 2:
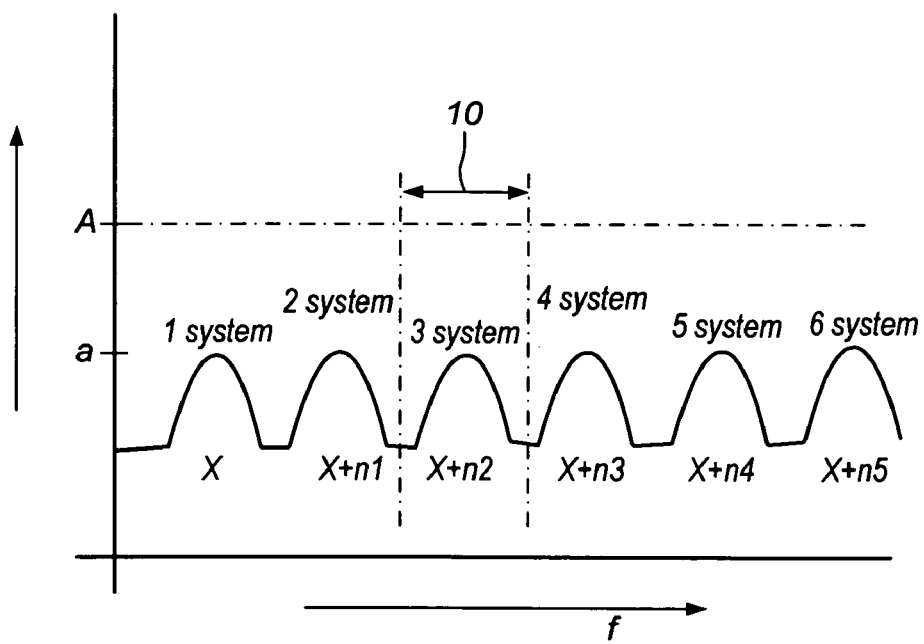
FIG. 2 is a schematic graph showing emission levels for the computing system of the present invention.
Figure 3:
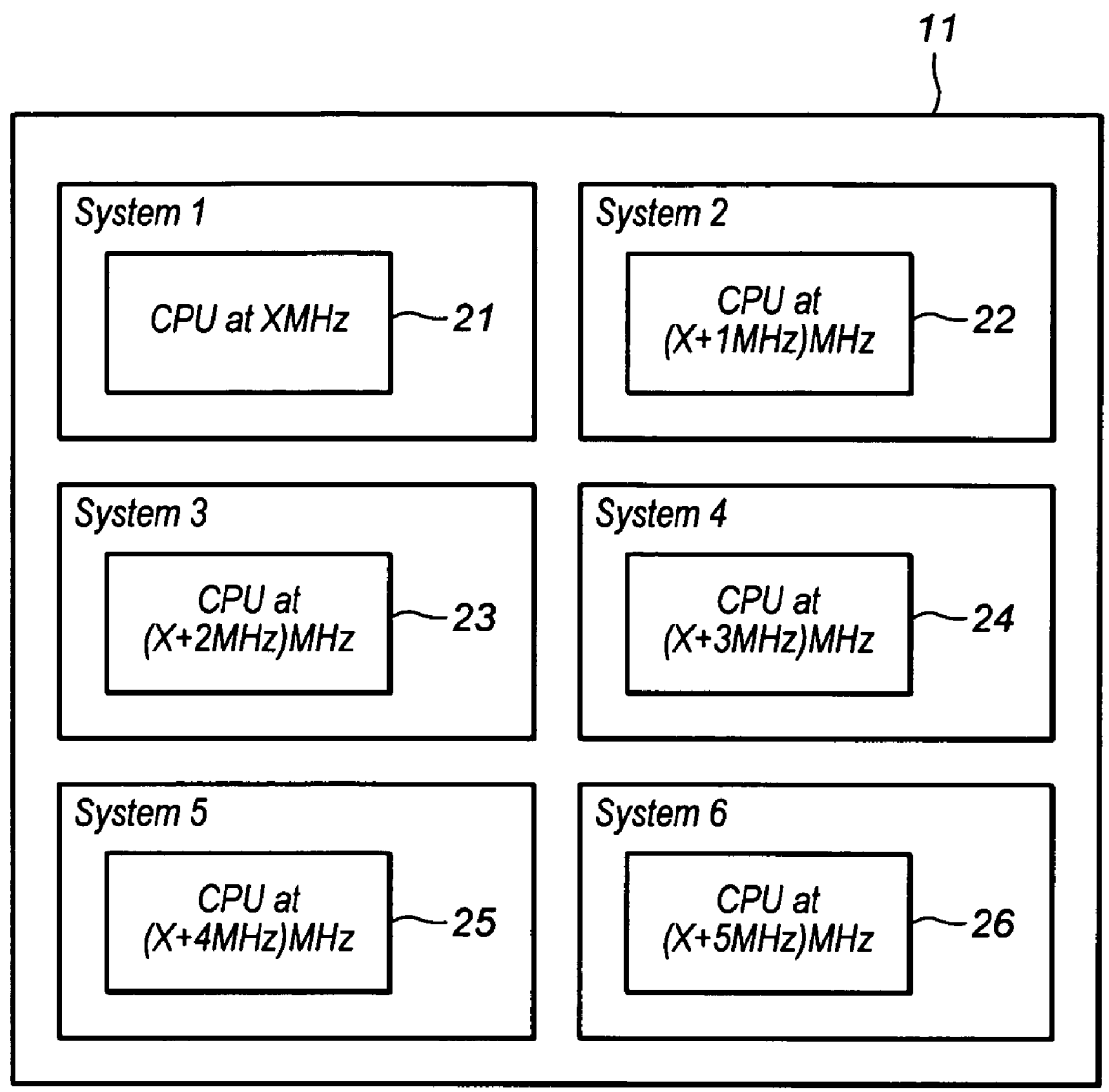
FIG. 3 illustrates a first embodiment computing system according to the present invention.

FIG. 2 shows a typical level of radiation for a multicore computer system operated according to the invention. Here it can be seen that the limit shown at A is not exceeded, because each CPU system is operated at a different frequency separated by at least the bandwidth of the measuring device as indicated at 10. In FIG. 2 system 1 operates at frequency X, system 2 at X+n1, system 3 at X+n2, system 4 at X+n3, system 5 at X+n4 and system 6 at X+n5. Thus for the same emission level of 20 dBµV for each CPU, the maximum level is 20 dBµV regardless of the number of CPU systems used or added. One example of such system is illustrated in FIG. 3 where six systems 1 to 6 are mounted in a rack 11. Each system or core 1 to 6 has a respective CPU 31 to 36 operating at a different frequency. System 1 has a CPU 21 operating at frequency XMHz; system 2 has a CPU 22 operating at frequency (X+1) MHz; system 3 has a CPU 23 operating at frequency (X+2) MHz; system 4 has a CPU 24 operating at frequency (X+3) MHz; system 5 has a CPU 25 operating at frequency (X+4) MHz; and system 6 has a CPU 26 operating at frequency (X+5) MHz.

Figure 4:
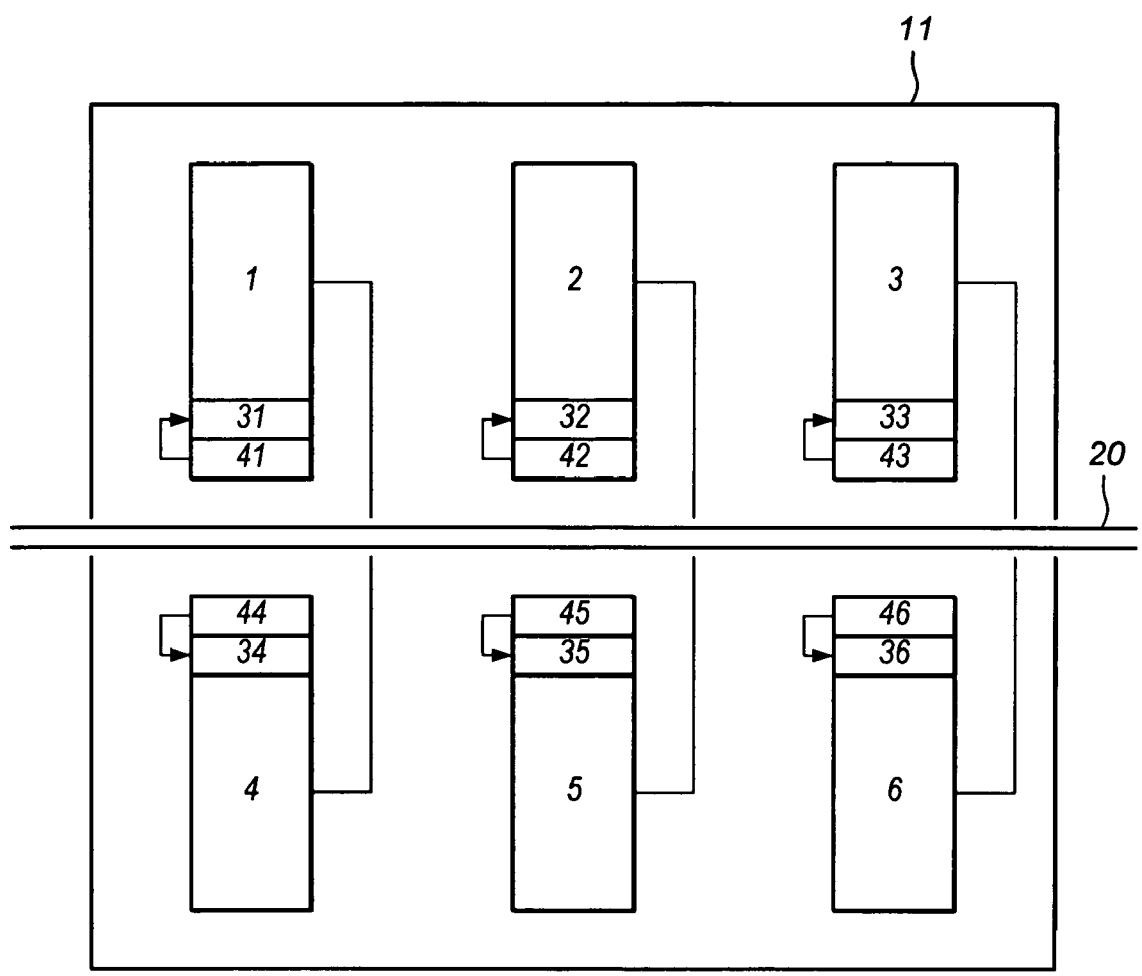
FIG. 4 illustrates a second embodiment computing system according to the present invention.

FIG. 4 is a highly schematic view of an alternative embodiment of a computer system to which the invention can be applied. Six CPUs are shown schematically at 1, 2, 3, 4, 5 and 6 mounted in box II and connected by system bus 20. A clock controller for each CPU is shown schematically at 31, 32, 33, 34, 35 and 36 respectively together with a random number generator for each CPU respectively labelled 41, 42, 43, 44, 45 and 46. Of course, this is only one example: a single random number generator may be used for all CPUs or other means of allocating or generating numbers.

On start-up (or resetting) of the computer system, each random number generator 41-46 generates a number which is used by the respective clock controller 31-36 as a multiplier to set the operating frequency of the respective CPU 1 to 6. Typically each random number generator 41-46 is set to generate a number between 1 and 6 corresponding to the total number at CPUs in the system and the clock controllers 31-36 multiply this number by a predetermined frequency difference figure of at least 120 KHz and preferably 1 or 2 MHZ to set the frequency difference between each of the operating frequencies of the CPUs.

In this example the frequency difference figure n is 4 MHZ and the CPUs 1 to 6 operate at respective frequencies 648, 644, 640, 636, 632 and 628 MHZ.

Figure 5:
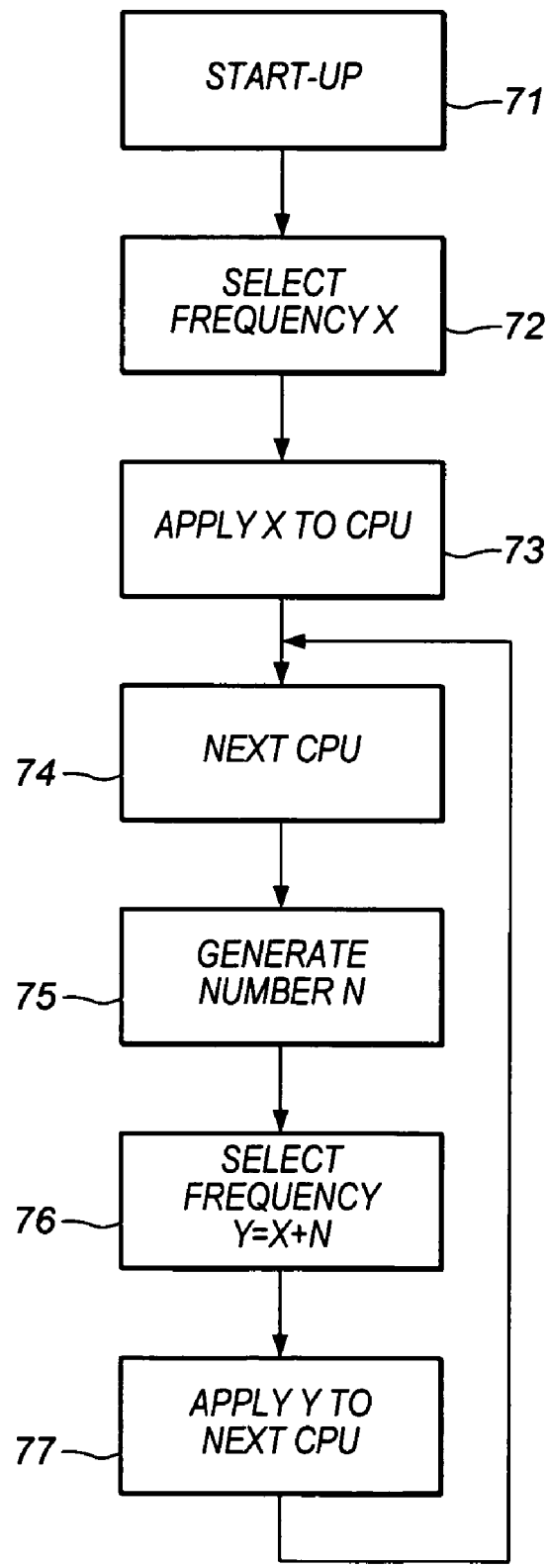
FIG. 5 is a flow diagram of the process of start-up of the apparatus of FIGS. 1 and 2.

FIG. 5 is a flow diagram illustrating a start-up procedure according to the invention for a multicore computer system such as that shown in FIGS. 3 and 4. On start-up 71 a first frequency X is selected 72 and applied 73 to a first CPU of the system, such as CPU 61 in FIG. 4. The procedure then moves to the next CPU 74. A number N is then generated 75 either by selection from a set of stored numbers or by a random number generator such as 41 in FIG. 3, or by selecting a digit from the address of a server in the system. The number N is then used to select 75 a second frequency Y=X+N and this frequency Y is applied 77 to the next CPU. This cycle is repeated until all CPUs or servers in the system have clock frequencies allocated to them.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method for operating a computer system comprising a first and a second computing unit, the method comprising selecting a first clock frequency for operation of said first computing unit, wherein said first frequency is a function of a first predetermined number allocated to said first computing unit, and selecting a second clock frequency for operation of said second computing unit, wherein said second clock frequency is different from said first clock frequency, wherein said second frequency is a function of a second predetermined number allocated to said second computing unit, wherein said first and said second clock frequency are each dynamically allocated to a respective computing unit on start-up or resetting of the system, and wherein said first and said second frequencies differ one from the other by at least a predetermined bandwidth.

2. A method according to claim 1 wherein said first predetermined number and said second predetermined number are each generated by a random number generator.

3. A method according to claim 1 wherein the predetermined minimum bandwidth is the bandwidth of a standard emission measuring device.

4. A method according to claim 1 wherein the predetermined minimum bandwidth is at least 120 KHz.

5. A method according to claim 1 wherein the predetermined minimum bandwidth is at least 1 MHz.

6. A method according to claim 1 wherein said first unit clock frequency differs from said second unit clock frequency by a multiple of said predetermined minimum bandwidth, and said multiple comprises said first predetermined number.

7. A method according to claim 6 wherein said first predetermined number comprises an integer between 1 and a number equal to the number of computing units in the system.

8. A method according to claim 1 wherein said first predetermined number is determined as a function of a digit of the address of the respective computing unit.

9. A method for operating a computer system comprising a plurality of computing units, the method comprising, selecting a plurality of different clock frequencies; allocating a different one of each of said plurality of clock frequencies to each of said plurality of computing units, wherein said allocating includes allocating a predetermined number to each computing unit and setting each unit clock frequency as a function of said number, wherein each different frequency is dynamically allocated to a respective computing unit on start-up or resetting of the system, and wherein each of said plurality of frequencies differs from at least one other of said frequencies by a predetermined bandwidth.

10. A method according to claim 9 wherein said number is generated by a random number generator.

11. A method according to claim 9 wherein each unit clock frequency differs from at least one other by a multiple of the predetermined minimum bandwidth.

12. A method according to claim 11 wherein said number comprises an integer between 1 and a number equal to the number of computing units in the system.

13. A method according to claim 9 wherein said number is determined as a function of a digit of the address of the respective computing unit.

14. An apparatus for start-up of a computer system comprising a plurality of computing units, the apparatus comprising means for setting a different clock frequency for each unit so that said units each operate at a different frequency, each frequency differing from another frequency by at least a predetermined minimum bandwidth, means for dynamically allocating a different frequency to a respective computing unit on start-up or resetting of the system, and means for determining said predetermined minimum bandwidth as a multiple of a predetermined base frequency.

15. An apparatus according to claim 14 further comprising means for allocating a predetermined number to each computing unit and setting each unit clock frequency as a function of said number.

16. An apparatus according to claim 15 wherein said number is used as a multiplier of the predetermined base frequency.

17. An apparatus according to claim 15 comprising means for determining said number as a function of a digit of the address of the respective computing unit.

* * * * *